(12) United States Patent
Geiger et al.

(10) Patent No.: US 10,714,110 B2
(45) Date of Patent: *Jul. 14, 2020

(54) DECODING DATA SEGMENTS REPRESENTING A TIME-DOMAIN DATA STREAM

(71) Applicant: Fraunhofer-Gesellschaft zur Foerderung der angewandten Forschung e.V., Munich (DE)

(72) Inventors: Ralf Geiger, Erlangen (DE); Max Neuendorf, Nuremberg (DE); Yoshikazu Yokotani, Shizuoka (JP); Nikolaus Rettelbach, Nuremberg (DE); Juergen Herre, Buckenhof (DE); Stefan Geyersberger, Wuerzburg (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 163 days.

This patent is subject to a terminal disclaimer.

(21) Appl. No.: 15/595,170

(22) Filed: May 15, 2017

(65) Prior Publication Data

US 2017/0249952 A1 Aug. 31, 2017

Related U.S. Application Data

(60) Continuation of application No. 15/094,984, filed on Apr. 8, 2016, now Pat. No. 9,653,089, which is a
(Continued)

(51) Int. Cl.
*G10L 19/18* (2013.01)
*G10L 19/02* (2013.01)
(Continued)

(52) U.S. Cl.
CPC .............. *G10L 19/18* (2013.01); *G10L 19/00* (2013.01); *G10L 19/02* (2013.01); *G10L 19/022* (2013.01);
(Continued)

(58) Field of Classification Search
CPC ......... G10L 19/18; G10L 19/20; G10L 19/22; G10L 19/24
See application file for complete search history.

(56) References Cited

U.S. PATENT DOCUMENTS 5,109,417 A * 4/1992 Fielder ................... G06T 9/005
375/240
5,214,742 A 5/1993 Edler
(Continued)

FOREIGN PATENT DOCUMENTS

CN 1338104 A 2/2002
EP 0575675 B1 11/1998
(Continued)

OTHER PUBLICATIONS

Fielder, et al., "Audio Coding Tools for Digital Television Distributio.", Preprint No. 5104 (F-5), AES 108th Convention, Paris, Feb. 2000, 25 pages.
(Continued)

*Primary Examiner* — Eric Yen
(74) *Attorney, Agent, or Firm* — Michael A. Glenn; Perkins Coie LLP

(57) ABSTRACT

An apparatus for decoding data segments representing a time-domain data stream, a data segment being encoded in the time domain or in the frequency domain, a data segment being encoded in the frequency domain having successive blocks of data representing successive and overlapping blocks of time-domain data samples. The apparatus includes a time-domain decoder for decoding a data segment being
(Continued)

encoded in the time domain and a processor for processing the data segment being encoded in the frequency domain and output data of the time-domain decoder to obtain overlapping time-domain data blocks. The apparatus further includes an overlap/add-combiner for combining the overlapping time-domain data blocks to obtain a decoded data segment of the time-domain data stream.

12 Claims, 11 Drawing Sheets

Related U.S. Application Data division of application No. 14/637,256, filed on Mar. 3, 2015, now Pat. No. 9,355,647, which is a division of application No. 14/250,306, filed on Apr. 10, 2014, now Pat. No. 9,043,202, which is a continuation of application No. 13/924,441, filed on Jun. 21, 2013, now Pat. No. 8,812,305, which is a division of application No. 12/518,627, filed as application No. PCT/EP2007/010665 on Dec. 7, 2007, now Pat. No. 8,818,796.

(60) Provisional application No. 60/869,670, filed on Dec. 12, 2006.

(51) Int. Cl.
| | | |
|---|---|---|
| H04N 21/2368 | (2011.01) | |
| H04N 21/2383 | (2011.01) | |
| H04N 21/2662 | (2011.01) | |
| H04N 21/434 | (2011.01) | |
| H04N 21/438 | (2011.01) | |
| H04N 19/00 | (2014.01) | |
| G10L 19/00 | (2013.01) | |
| G10L 19/022 | (2013.01) | |
| G10L 19/26 | (2013.01) | |
| G10L 19/032 | (2013.01) | |

(52) U.S. Cl.
CPC .......... G10L 19/032 (2013.01); G10L 19/265 (2013.01); H04N 19/00 (2013.01); H04N 21/2368 (2013.01); H04N 21/2383 (2013.01); H04N 21/2662 (2013.01); H04N 21/4341 (2013.01); H04N 21/4382 (2013.01)

(56) References Cited

U.S. PATENT DOCUMENTS

| | | | |
|---|---|---|---|
| 5,230,038 A | 7/1993 | Fielder et al. | |
| 5,327,518 A * | 7/1994 | George | G10L 19/02 704/211 |
| 5,394,473 A | 2/1995 | Davidson | |
| 5,550,924 A | 8/1996 | Helf et al. | |
| 5,570,455 A | 10/1996 | Remillard | |
| 5,615,299 A | 3/1997 | Bahl et al. | |
| 5,651,090 A | 7/1997 | Moriya et al. | |
| 5,669,484 A | 9/1997 | Paulson | |
| 5,699,484 A | 12/1997 | Davis | |
| 5,987,407 A | 11/1999 | Wu et al. | |
| 6,064,954 A | 5/2000 | Cohen et al. | |
| 6,085,163 A | 7/2000 | Todd | |
| 6,119,080 A | 9/2000 | Liu et al. | |
| 6,134,518 A * | 10/2000 | Cohen | G10L 19/18 704/201 |
| 6,188,987 B1 | 2/2001 | Fielder | |
| 6,226,608 B1 | 5/2001 | Fielder et al. | |
| 6,249,766 B1 | 6/2001 | Wynblatt et al. | |
| 6,311,154 B1 * | 10/2001 | Gersho | G10L 19/18 704/219 |
| 6,438,525 B1 | 8/2002 | Park | |
| 6,449,592 B1 | 9/2002 | Das et al. | |
| 6,640,209 B1 * | 10/2003 | Das | G10L 19/18 704/207 |
| 6,735,567 B2 | 5/2004 | Gao et al. | |
| 6,807,526 B2 | 10/2004 | Touimi et al. | |
| 6,865,537 B2 | 3/2005 | Mitsuo et al. | |
| 6,868,377 B1 * | 3/2005 | Laroche | G10L 19/20 341/111 |
| 7,272,556 B1 * | 9/2007 | Aguilar | G10L 19/093 704/201 |
| 7,283,954 B2 | 10/2007 | Crockett et al. | |
| 7,295,970 B1 | 11/2007 | Gorin et al. | |
| 7,333,929 B1 * | 2/2008 | Chmounk | G10L 19/24 704/200 |
| 7,720,235 B2 | 5/2010 | Abe et al. | |
| 7,840,411 B2 | 11/2010 | Hotho et al. | |
| 8,036,903 B2 | 10/2011 | Grill et al. | |
| 8,050,934 B2 | 11/2011 | Sakurai et al. | |
| 8,069,052 B2 | 11/2011 | Thumpudi et al. | |
| 8,306,812 B2 | 11/2012 | Cho | |
| 8,321,207 B2 | 11/2012 | Edler et al. | |
| 8,326,606 B2 | 12/2012 | Oshikiri | |
| 8,364,481 B2 | 1/2013 | Strope et al. | |
| 2001/0018650 A1 | 8/2001 | DeJaco | |
| 2001/0023396 A1 | 9/2001 | Gersho et al. | |
| 2001/0027399 A1 | 10/2001 | Yasushi et al. | |
| 2002/0035470 A1 | 3/2002 | Gao | |
| 2002/0049586 A1 | 4/2002 | Nishio et al. | |
| 2002/0111797 A1 | 8/2002 | Gao | |
| 2002/0111798 A1 * | 8/2002 | Huang | G10L 25/93 704/220 |
| 2002/0116182 A1 | 8/2002 | Gao et al. | |
| 2003/0004711 A1 * | 1/2003 | Koishida | G10L 19/18 704/223 |
| 2003/0125823 A1 | 7/2003 | Abe et al. | |
| 2003/0229490 A1 | 12/2003 | Etter | |
| 2004/0044521 A1 * | 3/2004 | Chen | G10L 19/0017 704/200.1 |
| 2004/0098267 A1 | 5/2004 | Kikuiri et al. | |
| 2004/0204943 A1 * | 10/2004 | Kirovski | G10L 19/018 704/273 |
| 2005/0071402 A1 | 3/2005 | Youn | |
| 2005/0091051 A1 | 4/2005 | Moriya et al. | |
| 2005/0185850 A1 | 8/2005 | Vinton et al. | |
| 2005/0232411 A1 * | 10/2005 | Srinivasan | G10L 25/48 379/413 |
| 2005/0261900 A1 | 11/2005 | Ojala et al. | |
| 2005/0278171 A1 | 12/2005 | Suppappola et al. | |
| 2006/0031075 A1 | 2/2006 | Oh et al. | |
| 2006/0100861 A1 * | 5/2006 | Breebaart | G10L 19/008 704/205 |
| 2006/0173675 A1 * | 8/2006 | Ojanpera | G10L 19/022 704/203 |
| 2006/0247928 A1 | 11/2006 | Cowdery et al. | |
| 2006/0271372 A1 | 11/2006 | Escott | |
| 2007/0016405 A1 | 1/2007 | Mehrotra et al. | |
| 2007/0016412 A1 * | 1/2007 | Mehrotra | G10L 19/0208 704/229 |
| 2007/0055513 A1 | 3/2007 | Hwang et al. | |
| 2007/0106502 A1 | 5/2007 | Kim et al. | |
| 2007/0112559 A1 | 5/2007 | Schuijers et al. | |
| 2007/0112573 A1 | 5/2007 | Gerrits et al. | |
| 2007/0118369 A1 | 5/2007 | Chen | |
| 2007/0124137 A1 | 5/2007 | D'Haes | |
| 2007/0124145 A1 | 5/2007 | Luan et al. | |
| 2007/0147518 A1 | 6/2007 | Bessette | |
| 2007/0299656 A1 | 12/2007 | Son et al. | |
| 2008/0097764 A1 | 4/2008 | Grill et al. | |
| 2008/0147414 A1 | 6/2008 | Son et al. | |
| 2008/0162121 A1 | 7/2008 | Son et al. | |
| 2009/0037180 A1 | 2/2009 | Kim et al. | |
| 2009/0198501 A1 | 8/2009 | Jeong et al. | |

FOREIGN PATENT DOCUMENTS

| | | |
|---|---|---|
| EP | 1396844 A1 | 3/2004 |
| JP | H08204576 A | 8/1996 |

(56) References Cited

FOREIGN PATENT DOCUMENTS

| JP | 2004302259 A | 10/2004 |
|----|--------------|---------|
| JP | 2009537084 A | 10/2009 |
| RU | 2214047 C2 | 10/2003 |
| RU | 2005135650 A | 3/2006 |
| WO | 9009022 A1 | 8/1990 |
| WO | 2005043511 A1 | 5/2005 |

OTHER PUBLICATIONS

Fielder, et al., "The Design of a Video Friendly Audio Coding System for Distributing Applications", Presented at the AES 17th International Conference on High-Quality Audio Coding; Italy, Sep. 1999, pp. 1-10.

Grill, et al., "A Two-or Three-Stage Bit-Rate Scalable Audio Coding System", Sep. 1995, Preprint No. 4132, 99th Convention of the AES, Preprint No. 4132, 99th Convention of the AES.

Niamut, et al., "Optimal Time Segmentation for Overlap-Add Systems With Variable Amount of Window Overlap", Oct. 2005; IEEE Signal Processisng Letters, vol. 12, No. 10, pp. 665-668.

Princen, et al., "Analysis/Synthesis Filter Bank Design Based on Time Domain Aliasing Cancellation", Oct. 1986; IEEE Trans. ASSP, ASSP-34(5), 1153-1161.

\* cited by examiner

DECODING DATA SEGMENTS REPRESENTING A TIME-DOMAIN DATA STREAM

CROSS-REFERENCE TO RELATED APPLICATIONS

This application is a continuation application of U.S. patent application Ser. No. 15/094,984, filed 8 Apr. 2016, which is a divisional application of U.S. patent application Ser. No. 14/637,256, filed 3 Mar. 2015, which issued as U.S. Pat. No. 9,355,647 on 31 May 2016, which is a divisional application of U.S. patent application Ser. No. 14/250,306, filed 10 Apr. 2014, which issued as U.S. Pat. No. 9,043,202 on 26 May 2015, which is a continuation application of U.S. patent application Ser. No. 13/924,441 filed 21 Jun. 2013, which issued as U.S. Pat. No. 8,812,305 on 19 Aug. 2014, which is a divisional application of U.S. patent application Ser. No. 12/518,627 filed 17 Dec. 2009, which issued as U.S. Pat. No. 8,818,796 on 26 Aug. 2014, which is a U.S. national entry of PCT Patent Application Serial No. PCT/EP2007/010665 filed 7 Dec. 2007, which claims priority to U.S. Provisional Patent Application No. 60/869,670 filed on 12 Dec. 2006, which are each incorporated herein in its entirety by this reference thereto.

BACKGROUND OF THE INVENTION

The present invention is in the field of coding, where different characteristics of data to be encoded are utilized for coding rates, as for example in video and audio coding.

State of the art coding strategies can make use of characteristics of a data stream to be encoded. For example, in audio coding, perception models are used in order to compress source data almost without decreasing the noticeable quality and degradation when replayed. Modern perceptual audio coding schemes, such as for example, MPEG-2/4 AAC (MPEG=Moving Pictures Expert Group, AAC=Advanced Audio Coding), cf. Generic Coding of Moving Pictures and Associated Audio: Advanced Audio Coding, International Standard 13818-7, ISO/IEC JTC1/SC29/WG11 Moving Pictures Expert Group, 1997, may use filter banks, such as for example the Modified Discrete Cosine Transform (MDCT), for representing the audio signal in the frequency domain.

In the frequency domain quantization of frequency coefficients can be carried out, according to a perceptual model. Such coders can provide excellent perceptual audio quality for general types of audio signals as, for example, music. On the other hand, modern speech coders, such as, for example, ACELP (ACELP=Algebraic Code Excited Linear Prediction), use a predictive approach, and in this way may represent the audio/speech signal in the time domain. Such speech coders can model the characteristics of the human speech production process, i.e. the human vocal tract and, consequently, achieve excellent performance for speech signals at low bit rates. Conversely, perceptual audio coders do not achieve the level of performance offered by speech coders for speech signals coded at low bit rates, and using speech coders to represent general audio signals/music results in significant quality impairments.

Conventional concepts provide a layered combination in which all partial coders are active, i.e. time-domain and frequency-domain encoders, and the final output signal is calculated by combining the contributions of the partial coders for a given processed time frame. A popular example of layered coding are MPEG-4 scalable speech/audio coding with a speech coder as the base layer and a filterbank-based enhancement layer, cf. Bernhard Grill, Karlheinz Brandenburg, "A Two- or Three-Stage Bit-Rate Scalable Audio Coding System", Preprint Number 4132, 99th Convention of the AES (September 1995).

Conventional frequency-domain encoders can make use of MDCT filterbanks. The MDCT has become a dominant filterbank for conventional perceptual audio coders because of its advantageous properties. For example, it can provide a smooth cross-fade between processing blocks. Even if a signal in each processing block is altered differently, for example due to quantization of spectral coefficients, no blocking artifacts due to abrupt transitions from block to block occur because of the windowed overlap/add operations. The MDCT uses the concept of time-domain aliasing cancellation (TDAC).

The MDCT is a Fourier-related transform based on the type-IV discrete cosine transform, with the additional property of being lapped. It is designed to be performed in consecutive blocks of a larger data set, where subsequent blocks are overlapped so that the last half of one block coincides with the first half of the next block. This overlapping, in addition to an energy-compaction quality of the DCT, makes the MDCT especially attractive for signal compression applications, since it helps to avoid said artifacts stemming from the block boundaries. As a lapped transform, the MDCT is a bit unusual compared to other Fourier-related transforms in that it has half as many outputs as inputs, instead of the same number. In particular, 2N real numbers are transformed into N real numbers, where N is a positive integer.

The inverse MDCT is also known as IMDCT. Because there are different numbers of inputs and outputs, at first glance it might seem that the MDCT should not be invertible. However, perfect invertibility is achieved by adding the overlap IDMCTs of subsequent overlapping blocks, causing the errors to cancel and the original data to be retrieved, i.e. achieving TDAC.

Therewith, the number of spectral values at the output of a filterbank is equal to the number of time-domain input values at its input which is also referred to as critical sampling.

An MDCT filterbank provides a high-frequency selectivity and enables a high coding gain. The properties of overlapping of blocks and critical sampling can be achieved by utilizing the technique of time-domain aliasing cancellation, cf. J. Princen, A. Bradley, "Analysis/Synthesis Filter Bank Design Based on Time Domain Aliasing Cancellation", IEEE Trans. ASSP, ASSP-34(5):1153-1161, 1986. FIG. 4 illustrates these effects of an MDCT. FIG. 4 shows an MDCT input signal, in terms of an impulse along a time axis 400 at the top. The input signal 400 is then transformed by two consecutive windowing and MDCT blocks, where the windows 410 are illustrated underneath the input signal 400 in FIG. 4. The back transformed individual windowed signals are displayed in FIG. 4 by the time lines 420 and 425.

After the inverse MDCT, the first block produces an aliasing component with positive sign 420, the second block produces an aliasing component with the same magnitude and a negative sign 425. The aliasing components cancel each other after addition of the two output signals 420 and 425 as shown in the final output 430 at the bottom of FIG. 4.

In "Extended Adaptive Multi-Rate—Wideband (AMR-WB+) codec", 3GPP TS 26.290V6.3.0, 2005-06, Technical Specification the AMR-WB+ (AMR-WB=Adaptive Multi-Rate Wideband) codec is specified. According to section 5.2, the encoding algorithm at the core of the AMR-WB+ codec is based on a hybrid ACELP/TCX (TCX=Transform coded Excitation) model. For every block of an input signal the encoder decides, either in an open loop or a closed loop mode which encoding model, i.e. ACELP or TCX, is best. The ACELP model is a time-domain, predictive encoder, best suited for speech and transient signals. The AMR-WB encoder is used in ACELP modes. Alternatively, the TCX model is a transform based encoder, and is more appropriate for typical music samples.

Specifically, the AMR-WB+ uses a discrete Fourier transform (DFT) for the transform coding mode TCX. In order to allow a smooth transition between adjacent blocks, a windowing and overlap is used. This windowing and overlap is useful both for transitions between different coding modes (TCX/ACELP) and for consecutive TCX frames. Thus, the DFT together with the windowing and overlap represents a filterbank that is not critically sampled. The filterbank produces more frequency values than the number of new input samples, cf. FIG. 4 in 3GPP TS 26.290V6.3.0 (3GPP=Third Generation Partnership Project, TS=Technical Specification). Each TCX frame utilizes an overlap of ⅛ of the frame length which equals the number of new input samples. Consequently, the corresponding length of the DFT is 9/8 of the frame length.

Considering the non-critically sampled DFT filterbank in the TCX, i.e. the number of spectral values at the output of the filterbank is larger than the number of time-domain input values at its input, this frequency domain coding mode is different from audio codecs such as AAC (AAC=Advanced Audio Coding) which utilizes an MDCT, a critically sampled lapped transform.

The Dolby E codec is described in Fielder, Louis D.; Todd, Craig C., "The Design of a Video Friendly Audio Coding System for Distributing Applications", Paper Number 17-008, The AES 17$^{th}$ International Conference: High-Quality Audio Coding (August 1999) and Fielder, Louis D.; Davidson, Grant A., "Audio Coding Tools for Digital Television Distribution", Preprint Number 5104, 108$^{th}$ Convention of the AES (January 2000). The Dolby E codec utilizes the MDCT filterbank. In the design of this coding, special focus was put on the possibility to perform editing in the coding domain. To achieve this, special alias-free windows are used. At the boundaries of these windows a smooth-cross fade or splicing of different signal portions is possible. In the above-referenced documents it is, for example, outlined, cf. section 3 of "The Design of a Video Friendly Audio Coding System for Distribution Applications", that this would not be possible by simply using the usual MDCT windows which introduce time-domain aliasing. However, it is also described that the removal of aliasing comes at the cost of an increased number of transform coefficients, indicating that the resulting filterbank does not have the property of critical sampling anymore.

SUMMARY

According to an embodiment, an apparatus for decoding data segments representing a time-domain data stream, a data segment being encoded in the time domain or in the frequency domain, a data segment being encoded in the frequency domain having successive blocks of data representing successive and overlapping blocks of time-domain data samples, wherein two consecutive time-domain data blocks of which one being encoded in the frequency domain and one being encoded in the time domain having a time domain overlapping region, may have: a time-domain decoder for decoding a data segment being encoded in the time domain to acquire output data of the time-domain decoder; a processor for processing the data segments being encoded in the frequency domain and the output data of the time-domain decoder to acquire overlapping time-domain data blocks for the time domain overlapping region; and an overlap/add-combiner for combining the overlapping time-domain data blocks in the time domain overlapping region to acquire a decoded data segment of the time-domain data stream for the time domain overlapping region.

According to another embodiment, a method for decoding data segments representing a time-domain data stream, a data segment being encoded in the time domain or in the frequency domain, a data segment being encoded in the frequency domain having successive blocks of data representing successive and overlapping blocks of time-domain data samples, wherein two consecutive time-domain data blocks of which one being encoded in the frequency domain and one being encoded in the time domain having a time domain overlapping region, may have the steps of: decoding a data segment being encoded in the time domain to acquire output data of the time-domain decoder; processing the data segment being encoded in the frequency domain and the output data of the time-domain decoder to acquire overlapping time-domain data blocks for the time domain overlapping region; and combining the overlapping time-domain data blocks in the time domain overlapping region to acquire a decoded data segment of the time-domain data stream for the time domain overlapping region.

According to another embodiment, a computer program may have: a program code for performing the method for decoding data segments representing a time-domain data stream, a data segment being encoded in the time domain or in the frequency domain, a data segment being encoded in the frequency domain having successive blocks of data representing successive and overlapping blocks of time-domain data samples, wherein two consecutive time-domain data blocks of which one being encoded in the frequency domain and one being encoded in the time domain having a time domain overlapping region, wherein the method may have the steps of: decoding a data segment being encoded in the time domain to acquire output data of the time-domain decoder; processing the data segment being encoded in the frequency domain and the output data of the time-domain decoder to acquire overlapping time-domain data blocks for the time domain overlapping region; and combining the overlapping time-domain data blocks in the time domain overlapping region to acquire a decoded data segment of the time-domain data stream for the time domain overlapping region, when the program code runs on a computer.

According to another embodiment, an apparatus for generating an encoded data stream based on a time-domain data stream, the time-domain data stream having samples of a signal, may have: a segment processor for providing data segments from the data stream, two consecutive data segments having a first or a second overlapping region, the second overlapping region being smaller than the first overlapping region; a time-domain encoder for encoding a windowed data segment in the time domain; a frequency-domain encoder for applying weights to samples of the time-domain data stream according to a first or second windowing function to acquire a windowed data segment, the first and second windowing functions being adapted to the first and second overlapping regions, the frequency-domain encoder being adapted for encoding a windowed data segment in the frequency domain; a time-domain data analyzer for determining a transition indication associated with a data segment; and a controller for controlling the apparatus such that for data segments having a first transition indication output data of the time-domain encoder is included in the encoded data stream and for data segments having a second transition indication, output data of the frequency-domain encoder is included in the encoded data stream.

According to another embodiment, a method for generating an encoded data stream based on a time-domain data stream, the time-domain data stream having samples of a signal, may have the steps of: providing data segments from the data stream, two consecutive data segments having a first or a second overlapping region, the second overlapping region being smaller than the first overlapping region; determining a transition indication associated with the data segments; encoding a data segment in the time domain, and/or applying weights to samples of the time-domain data stream according to a first or a second windowing function to acquire a windowed data segment, the first and second windowing functions being adapted to the first and second overlapping regions and encoding the windowed data segment in the frequency domain and; controlling such that for data segments having a first transition indication output data being encoded in the time-domain is included in the encoded data stream and for data segments having a second transition indication output data being encoded in the frequency domain is included in the encoded data stream.

According to another embodiment, a computer program may have: a program code for performing the method for generating an encoded data stream based on a time-domain data stream, the time-domain data stream having samples of a signal, wherein the method may have the steps of: providing data segments from the data stream, two consecutive data segments having a first or a second overlapping region, the second overlapping region being smaller than the first overlapping region; determining a transition indication associated with the data segments; encoding a data segment in the time domain, and/or applying weights to samples of the time-domain data stream according to a first or a second windowing function to acquire a windowed data segment, the first and second windowing functions being adapted to the first and second overlapping regions and encoding the windowed data segment in the frequency domain and; controlling such that for data segments having a first transition indication output data being encoded in the time-domain is included in the encoded data stream and for data segments having a second transition indication output data being encoded in the frequency domain is included in the encoded data stream, when the program code runs on a computer.

The present invention is based on the finding that a more efficient encoding and decoding concept can be utilized by using combined time-domain and frequency-domain encoders, respectively decoders. The problem of time aliasing can be efficiently combat by transforming time-domain data to the frequency-domain in the decoder and by combining the resulting transformed frequency-domain data with the decoded frequency-domain data received. Overheads can be reduced by adapting overlapping regions of overlap windows being applied to data segments to coding domain changes. Using windows with smaller overlapping regions can be beneficial when using time-domain encoding, respectively when switching from or to time-domain encoding.

Embodiments can provide a universal audio encoding and decoding concept that achieves improved performance for both types of input signals, such as speech signals and music signals. Embodiments can take advantage by combining multiple coding approaches, e.g. time-domain and frequency-domain coding concepts. Embodiments can efficiently combine filterbank based and time-domain based coding concepts into a single scheme. Embodiments may result in a combined codec which can, for example, be able to switch between an audio codec for music-like audio content and a speech codec for speech-like content. Embodiments may utilize this switching frequently, especially for mixed content.

Embodiments of the present invention may provide the advantage that no switching artifacts occur. In embodiments the amount of additional transmit data, or additionally coded samples, for a switching process can be minimized in order to avoid a reduced efficiency during this phase of operation. Therewith the concept of switched combination of partial coders is different from that of the layered combination in which all partial coders are active.

BRIEF DESCRIPTION OF THE DRAWINGS

Embodiments of the present invention will be detailed subsequently referring to the appended drawings, in which.

DETAILED DESCRIPTION OF THE INVENTION

Figure 1A:
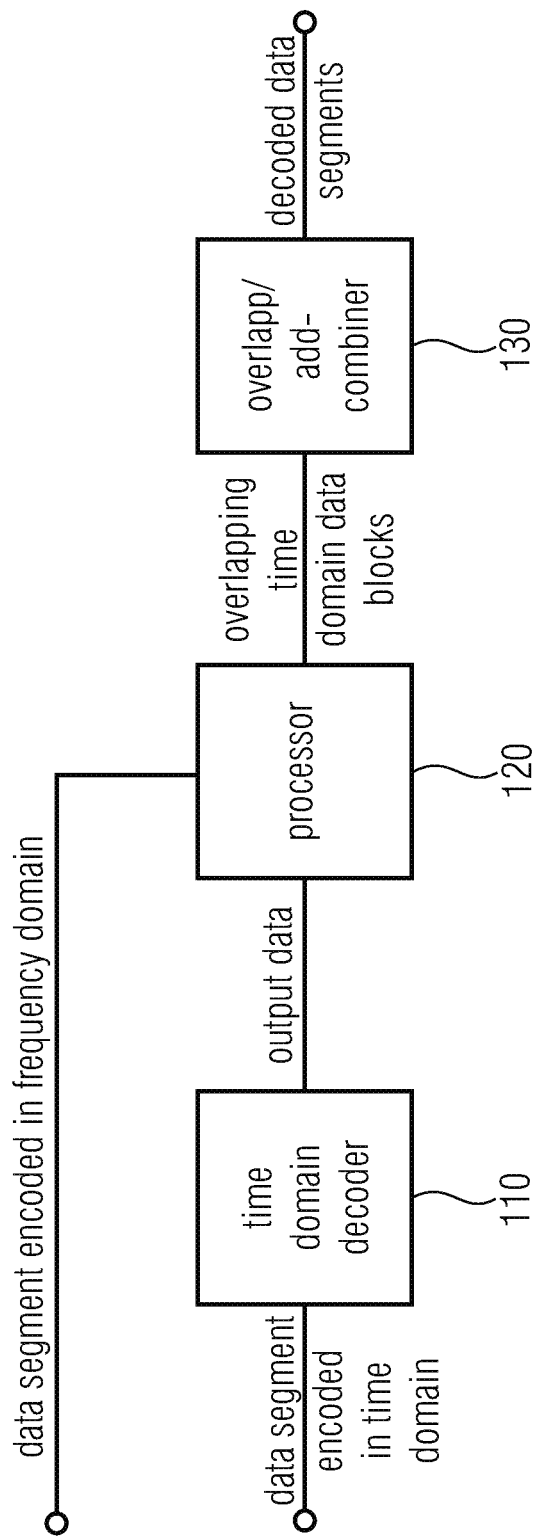
FIG. 1a shows an embodiment of an apparatus for decoding.

FIG. 1a shows an apparatus 100 for decoding data segments representing a time-domain data stream, a data segment being encoded in a time domain or in a frequency domain, a data segment being encoded in the frequency domain having successive blocks of data representing successive and overlapping blocks of time-domain data samples. This data stream could, for example, correspond to an audio stream, wherein some of the data blocks are encoded in the time domain and other ones are encoded in the frequency domain. Data blocks or segments which have been encoded in the frequency domain, may represent time-domain data samples of overlapping data blocks.

The apparatus 100 comprises a time-domain decoder 110 for decoding a data segment being encoded in the time domain. Furthermore, the apparatus 100 comprises a processor 120 for processing the data segment being encoded in the frequency domain and output data of the time-domain decoder 110 to obtain overlapping time-domain data blocks. Moreover, the apparatus 100 comprises an overlap/add-combiner 130 for combining the overlapping time-domain data blocks to obtain the decoded data segments of the time-domain data stream.

Figure 1B:
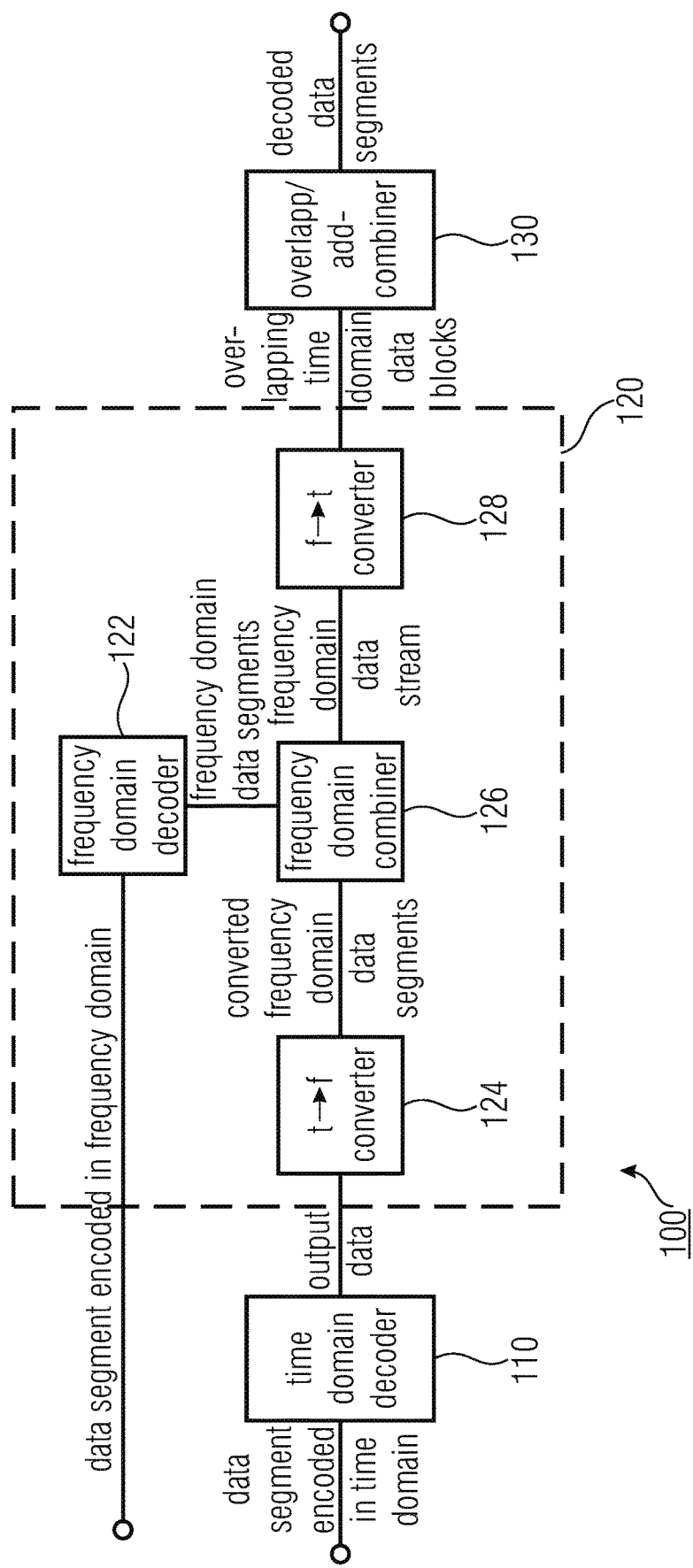
FIG. 1b shows another embodiment of an apparatus for decoding.

FIG. 1b shows another embodiment of the apparatus 100. In embodiments the processor 120 may comprise a frequency-domain decoder 122 for decoding data segments being encoded in the frequency domain to obtain frequency-domain data segments. Moreover, in embodiments the processor 120 may comprise a time-domain to frequency-domain converter 124 for converting the output data of the time-domain decoder 110 to obtain converted frequency-domain data segments.

Furthermore, in embodiments the processor 120 may comprise a frequency-domain combiner 126 for combining the frequency-domain segments and the converted frequency-domain data segments to obtain a frequency-domain data stream. The processor 120 may further comprise a frequency-domain to time-domain converter 128 for converting the frequency-domain data stream to overlapping time-domain data blocks which can then be combined by the overlap/add-combiner 130.

Embodiments may utilize an MDCT filterbank, as for example, used in MPEG-4 AAC, without any modifications, especially without giving up the property of critical sampling. Embodiments may provide optimum coding efficiency. Embodiments may achieve a smooth transition to a time-domain codec compatible with the established MDCT windows while introducing no additional switching artifacts and only a minimal overhead.

Embodiments may keep the time-domain aliasing in the filterbank and intentionally introduce a corresponding time-domain aliasing into the signal portions coded by the time-domain codec. Thus, resulting components of the time-domain aliasing can cancel each other out in the same way as they do for two consecutive frames of the MDCT spectra.

Figure 1C:
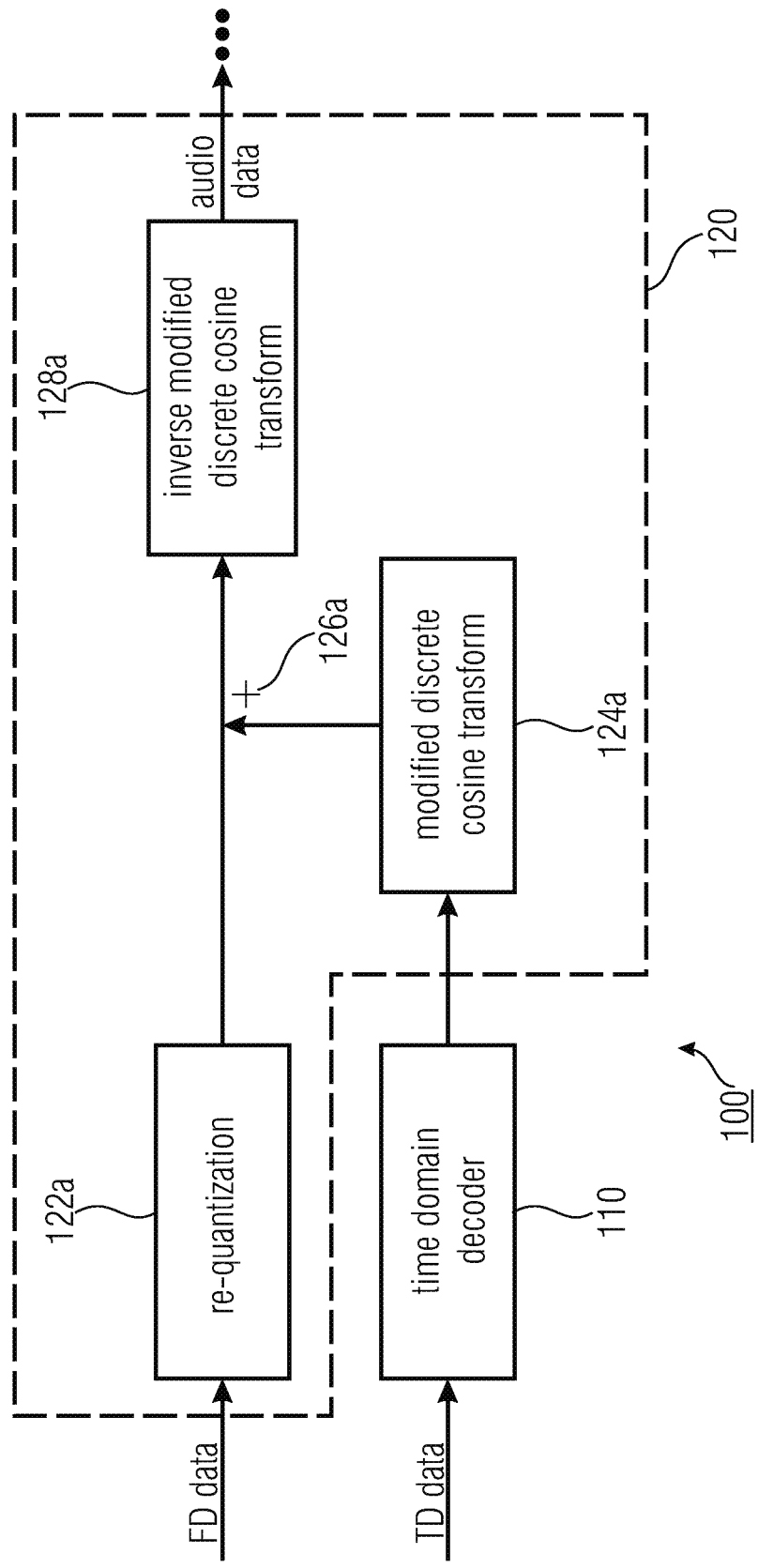
FIG. 1c shows another embodiment of an apparatus for decoding.

FIG. 1c illustrates another embodiment of an apparatus 100. According to FIG. 1c the frequency-domain decoder 122 can comprise a re-quantization stage 122a. Moreover, the time-domain to frequency-domain converter 124 can comprise a cosine modulated filterbank, an extended lapped transform, a low delay filterbank or a polyphase filterbank. The embodiment shown in FIG. 1c illustrates that the time-domain to frequency-domain converter 124 can comprise an MDCT 124a.

Furthermore, FIG. 1c depicts that the frequency-domain combiner 126 may comprise an adder 126a. As shown in FIG. 1c, the frequency-domain to time-domain converter 128 can comprise a cosine modulated filterbank, respectively an inverse MDCT 128a. The data stream comprising time-domain encoded and frequency-domain encoded data segment may be generated by an encoder which will be further detailed below. The switching between frequency-domain encoding and time-domain encoding can be achieved by encoding some portions of the input signal with a frequency-domain encoder and some input signal portions with a time-domain encoder. The embodiment of the apparatus 100 depicted in FIG. 1c illustrates the principle structure of a corresponding apparatus 100 for decoding. In other embodiments the re-quantization 122a and the inverse modified discrete cosine transform 128a can represent a frequency-domain decoder.

As indicated in FIG. 1c for signal portions where the time-domain decoder 110 takes over, the time-domain output of the time-domain decoder 110 can be transformed by the forward MDCT 124a. The time-domain decoder may utilize a prediction filter to decode the time-domain encoded data. Some overlap in the input of the MDCT 124a and thus some overhead may be introduced here. In the following embodiments will be described which reduce or minimize this overhead.

In principle, the embodiment shown in FIG. 1c also comprises an operation mode where both codecs can operate in parallel. In embodiments the processor 120 can be adapted for processing a data segment being encoded in parallel in the time domain and in the frequency domain. In this way the signal can partially be coded in the frequency domain and partially in the time domain, similar to a layered coding approach. The resulting signals are then added up in the frequency domain, compare the frequency-domain combiner 126a. Nevertheless, embodiments may carry out a mode of operation which is to switch exclusively between the two codecs and only have an advantageously minimum number of samples where both codecs are active in order to obtain best possible efficiency.

Figure 1D:
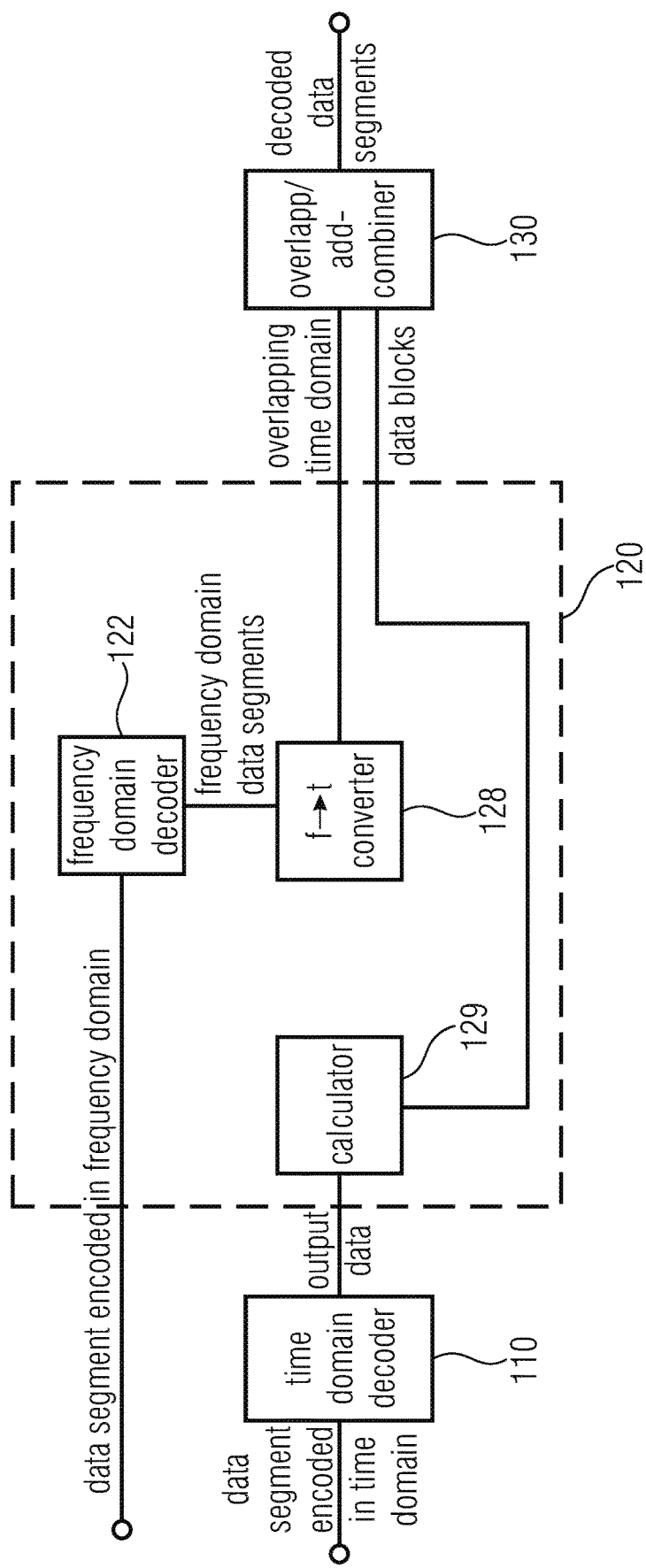
FIG. 1d shows another embodiment of an apparatus for decoding.

In FIG. 1c, the output of the time-domain decoder 110 is transformed by the MDCT 124a, followed by the IMDCT 128a. In another embodiment, these two steps may be advantageously combined into a single step in order to reduce complexity. FIG. 1d illustrates an embodiment of an apparatus 100 illustrating this approach. The apparatus 100 shown in FIG. 1d illustrates that the processor 120 may comprise a calculator 129 for calculating overlapping time-domain data blocks based on the output data of the time-domain decoder 110. The processor 120 or the calculator 129 can be adapted for reproducing a property respectively an overlapping property of the frequency-domain to time-domain converter 128 based on the output data of the time-domain decoder 110, i.e. the processor 120 or calculator 129 may reproduce an overlapping characteristic of time-domain data blocks similar to an overlapping characteristic produced by the frequency-domain to time-domain converter 128. Moreover, the processor 120 or calculator 129 can be adapted for reproducing time-domain aliasing similar to time-domain aliasing introduced by the frequency-domain to time-domain converter 128 based on the output data of the time-domain decoder 110.

The frequency-domain to time-domain converter 128 can then be adapted for converting the frequency-domain data segments provided by the frequency-domain decoder 122 to overlapping time-domain data blocks. The overlap/add-combiner 130 can be adapted for combining data blocks provided by the frequency-domain to time-domain converter 128 and the calculator 129 to obtain the decoded data segments of the time-domain data stream.

Figure 1E:
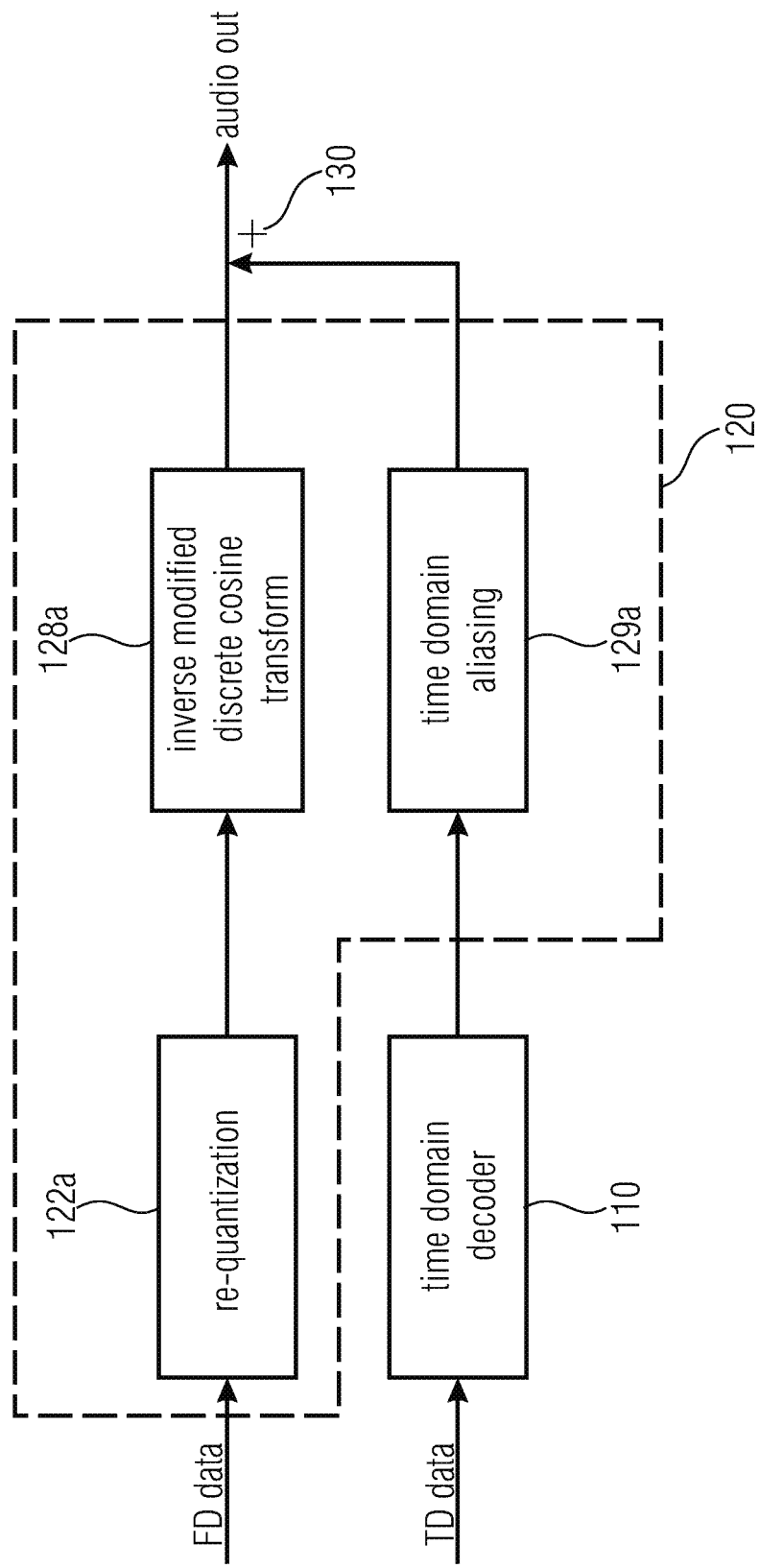
FIG. 1e shows another embodiment of an apparatus for decoding.

The calculator 129 may comprise a time-domain aliasing stage 129a as it is illustrated in the embodiment shown in FIG. 1e. The time-domain aliasing stage 129a can be adapted for time-aliasing output data of the time-domain decoder to obtain the overlapping time-domain data blocks.

For the time-domain encoded data a combination of the MDCT and the IMDCT can make the process in embodiments much simpler in both structure and computational complexity as only the process of time-domain aliasing (TDA) remains in embodiments. This efficient process can be based on a number of observations. The windowed MDCT of the input segments of 2N samples can be decomposed into three steps.

First, the input signal is multiplied by an analysis window.

Second, the result is then folded down from 2N samples to N samples. For the MDCT, this process implies that the first quarter of the samples is combined, i.e. subtracted, in time-reversed order with the second quarter of the samples, and that the fourth quarter of the samples is combined, i.e. added, with the third quarter of the samples in time-reversed order. The result is the time-aliased, down-sampled signal in the modified second and third quarter of the signal, comprising N samples.

Third, the down-sampled signal is then transformed using an orthogonal DCT-like transform mapping N input to N output samples to form the final MDCT output.

The windowed IMDCT reconstruction of an input sequence of N spectral samples can likewise be decomposed into three steps.

First, the input sequence of N spectral samples is transformed using an orthogonal inverse DCT-like transform mapping N input to N output samples.

Second, the results unfolded from N to 2N samples by writing the inverse DCT transformed values into the second and third quarter of a 2N samples output buffer, filling the first quarter with the time-reversed and inverted version of the second quarter, and the fourth quarter with a time-reverse version of the third quarter, respectively.

Third, the resulting 2N samples are multiplied with the synthesis window to form the windowed IMDCT output.

Thus, a concatenation of the windowed MDCT and the windowed IMDCT may be efficiently carried out in embodiments by the sequence of the first and second steps of the windowed MDCT and the second and third steps of the windowed IMDCT. The third step of the MDCT and the first step of the IMDCT can be omitted entirely in embodiments because they are inverse operations with respect to each other and thus cancel out.

The remaining steps can be carried out in the time domain only, and thus embodiments using this approach can be substantially low in computational complexity.

For one block of MDCT and consecutive IMDCT, the second and third step of the MDCT and the second and third step of the IMDCT can be written as a multiplication with the following sparse 2N×2N matrix.

$$\begin{bmatrix} 1 & & & -1 & 0 & \ldots & \ldots & 0 \\ & \ddots & \ddots & & \vdots & & & \vdots \\ & \ddots & \ddots & & \vdots & & & \vdots \\ -1 & & & 1 & 0 & \ldots & \ldots & 0 \\ 0 & \ldots & \ldots & 0 & 1 & & & 1 \\ \vdots & & & \vdots & & \ddots & \ddots & \\ \vdots & & & \vdots & & \ddots & \ddots & \\ 0 & \ldots & \ldots & 0 & 1 & & & 1 \end{bmatrix}$$

In other words, the calculator 129 can be adapted for segmenting the output of the time-domain decoder 110 in calculator segments comprising 2N sequential samples, applying weights to the 2N samples according to an analysis windowing function, subtracting the first N/2 samples in reversed order from the second N/2 samples, and the last N/2 samples in reversed order to the third N/2 samples, inverting the second and third N/2 samples, replacing the first N/2 samples with the time-reversed and inverted version of the second N/2 samples, replacing the fourth N/2 samples with the time reversed version of the third N/2 samples, and applying weights to the 2N samples according to a synthesis windowing function.

In other embodiments the overlap/add-combiner 130 can be adapted for applying weights according to a synthesis windowing function to overlapping time-domain data blocks provided by the frequency-domain to time-domain converter 128. Furthermore, the overlap/add-combiner 130 can be adapted for applying weights according to a synthesis windowing function being adapted to the size of an overlapping region of consecutive overlapping time-domain data blocks.

The calculator 129 may be adapted for applying weights to the 2N samples according to an analysis windowing function being adapted to the size of an overlapping region of consecutive overlapping time-domain data blocks and the calculator may be further adapted for applying weights to the 2N samples according to a synthesis window function being adapted to the size of the overlapping region.

In embodiments the size of an overlapping region of two consecutive time-domain data blocks which are encoded in the frequency-domain can be larger than the size of an overlapping of two consecutive time-domain data blocks of which one being encoded in the frequency domain and one being encoded in the time domain.

In embodiments, the size of the data segments can be adapted to the size of the overlapping regions. Embodiments may have an efficient implementation of a combined MDCT/IMDCT processing, i.e. a block TDA comprising the operations of analysis windowing, folding and unfolding, and synthesis windowing. Moreover, in embodiments some of these steps may be partially or fully combined in an actual implementation.

Figure 1F:
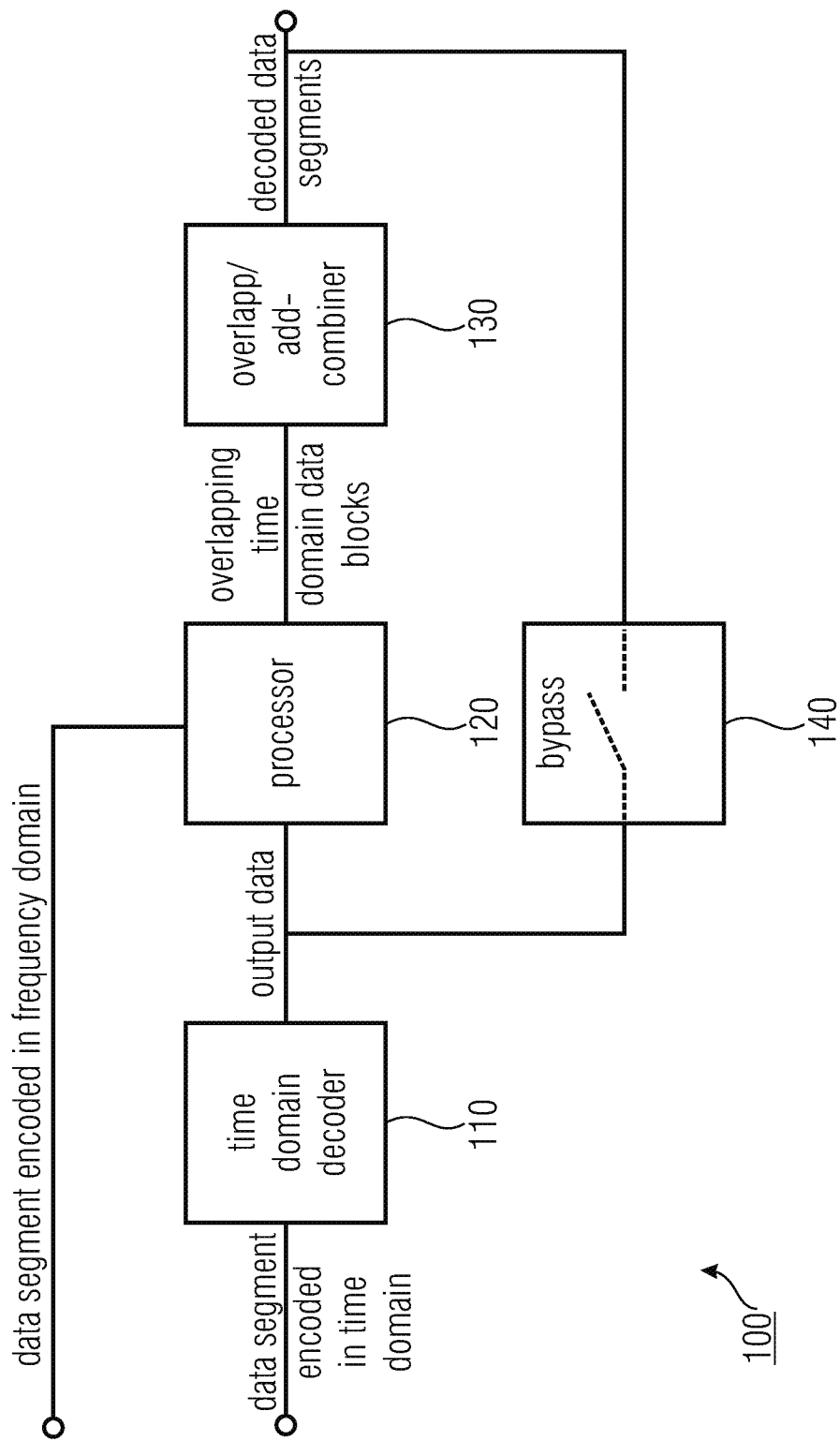
FIG. 1f shows another embodiment of an apparatus for decoding.

Another embodiment of an apparatus 100 as shown in FIG. 1f illustrates that an apparatus 100 may further comprise a bypass 140 for the processor 120 and the overlay/add-combiner 130 being adapted for bypassing the processor 120 and the overlay/add-combiner 130 when non-overlapping consecutive time-domain data blocks occur in data segments, which are encoded in the time domain. If multiple data segments are encoded in the time domain, i.e. no conversion to the frequency domain may be useful for decoding consecutive data segments, they may be transmitted without any overlapping. For these cases the embodiments as shown in FIG. 1f may bypass the processor 120 and the overlap/add-combiner 130. In embodiments the overlapping of blocks can be determined according to the AAC-specifications.

Figure 2A:
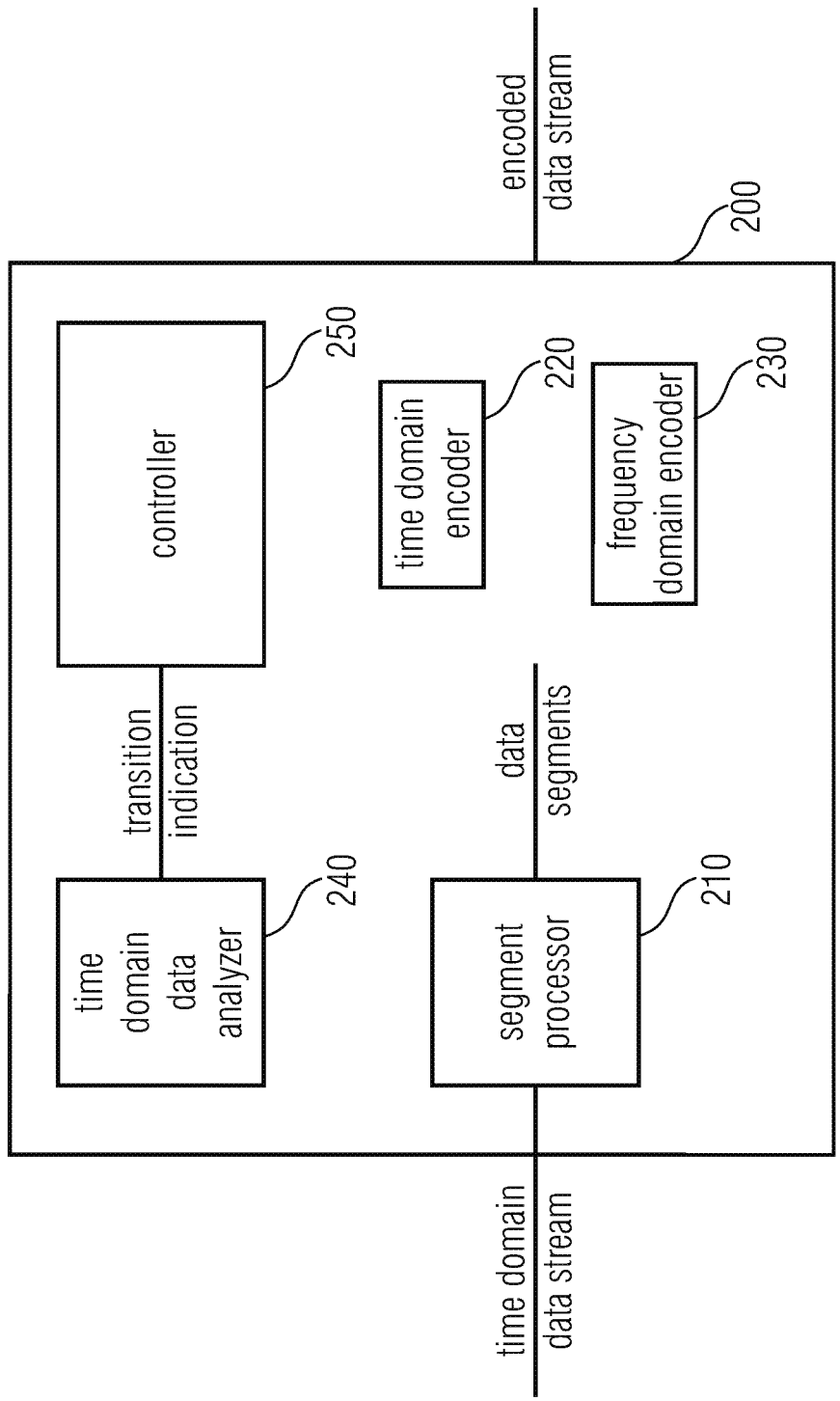
FIG. 2a shows an embodiment of an apparatus for encoding.

FIG. 2a shows an embodiment of an apparatus 200 for generating an encoded data stream based on a time-domain data stream, the time-domain data stream having samples of a signal. The time-domain data stream could, for example, correspond to an audio signal, comprising speech sections and music sections or both at the same time. The apparatus 200 comprises a segment processor 210 for providing data segments from the data stream, two consecutive data segments having a first or a second overlapping region, the second overlapping region being smaller than the first overlapping region. The apparatus 200 further comprises a time-domain encoder 220 for encoding a data segment in the time domain and a frequency-domain encoder 230 for applying weights to samples of the time-domain data stream according to a first or a second windowing function to obtain a windowed data segment, the first and second windowing functions being adapted to the first and second overlapping regions and for encoding the windowed data segment in the frequency domain.

Furthermore, the apparatus 200 comprises a time-domain data analyzer 240 for determining a transmission indication associated with a data segment and a controller 250 for controlling the apparatus such that for data segments having a first transition indication, output data of the time-domain encoder 220 is included in the encoded data stream and for data segments having a second transition indication, output data of the frequency-domain encoder 230 is included in the encoded data stream.

Figure 2B:
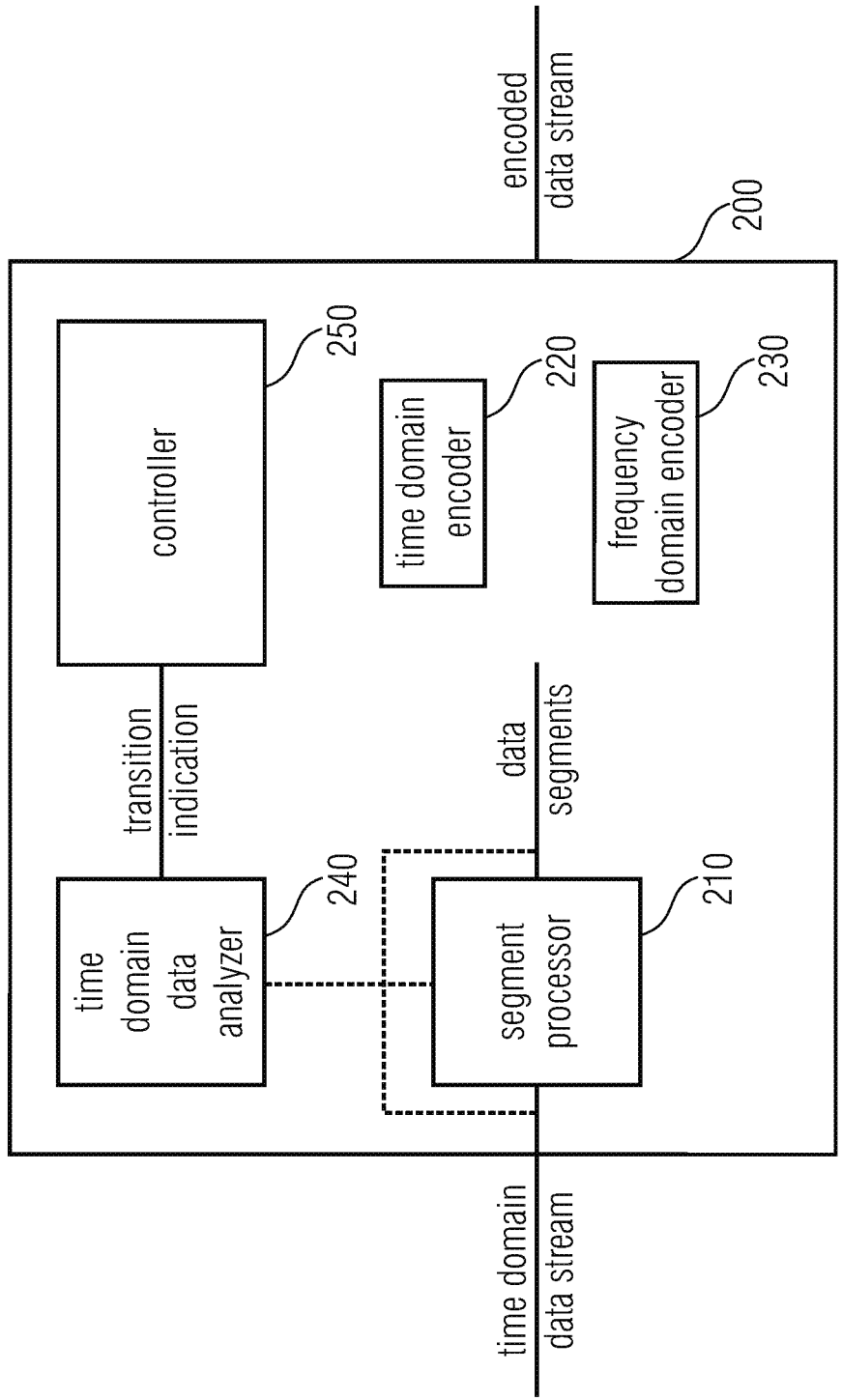
FIG. 2b shows another embodiment of an apparatus for encoding.

In embodiments the time-domain data analyzer 240 may be adapted for determining the transition indication from the time-domain data stream or from data segments provided by the segment processor 210. These embodiments are indicated in FIG. 2b. In FIG. 2b it is illustrated that the time-domain data analyzer 240 may be coupled to the input of the segment processor 210 in order to determine the transition indication from the time-domain data stream. In another embodiment the time-domain data analyzer 240 may be coupled to the output of the segment processor 210 in order to determine the transition indication from the data segments. In embodiments the time-domain data analyzer 240 can be coupled directly to the segment processor 210 in order to determine the transition indication from data provided directly by the segment processor. These embodiments are indicated by the dotted lines in FIG. 2b.

In embodiments the time-domain data analyzer 240 can be adapted for determining a transition measure, the transition measure being based on a level of transience in the time-domain data stream or the data segments wherein the transition indicator may indicate whether the level of transience exceeds a predetermined threshold.

Figure 2C:
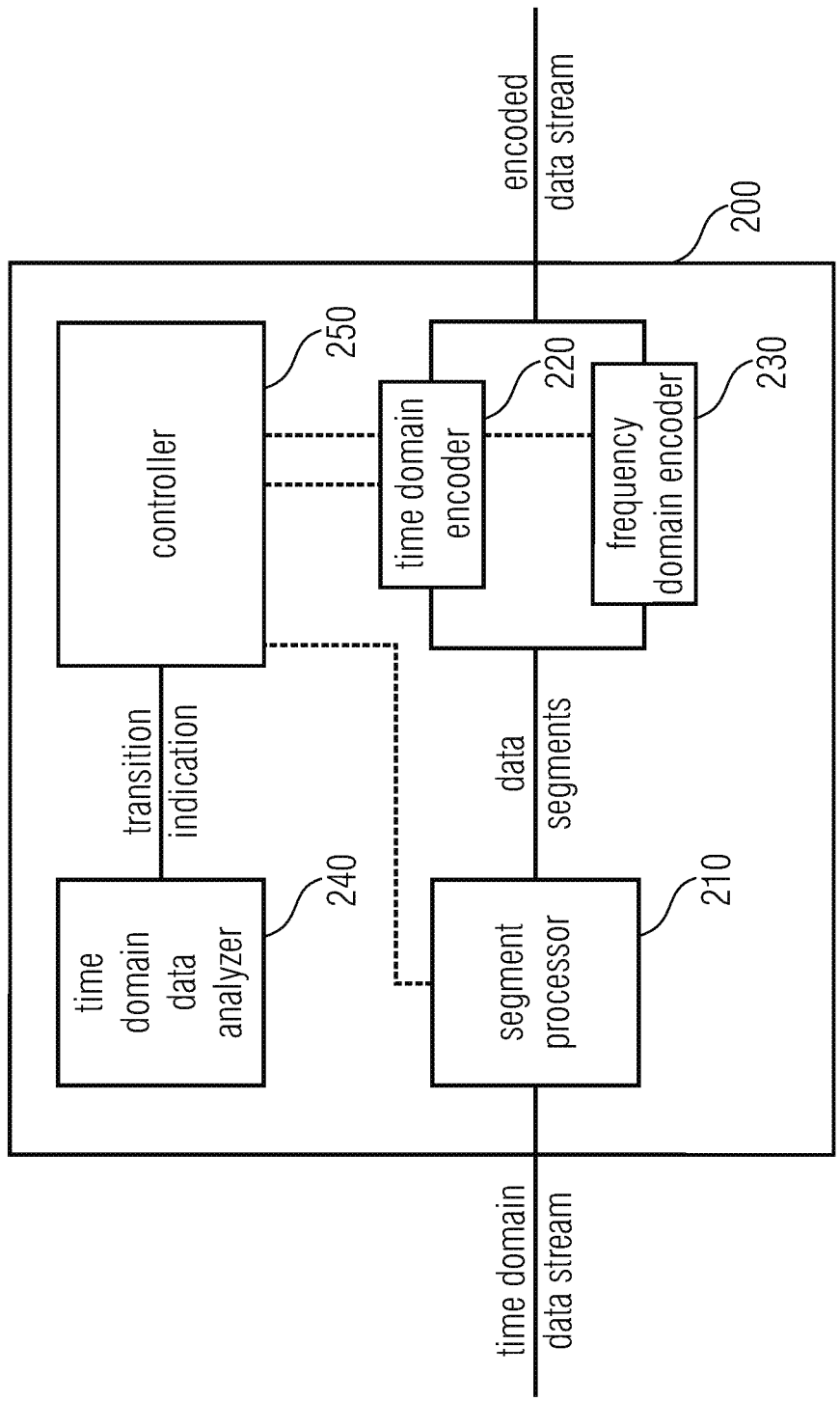
FIG. 2c shows another embodiment of an apparatus for encoding.

FIG. 2c shows another embodiment of the apparatus 200. In the embodiments shown in FIG. 2c the segment processor 210 can be adapted for providing data segments with the first and the second overlapping regions, the time-domain encoder 220 can be adapted for encoding all data segments, the frequency-domain encoder 230 may be adapted for encoding all windowed data segments and the controller 250 can be adapted for controlling the time-domain encoder 220 and the frequency-domain encoder 220 and the frequency-domain encoder 230 such that for data segments having a first transition indication, output data of the time-domain encoder 220 is included in the encoded data stream and for data segments having a second transition indication, output data of the frequency-domain encoder 230 is included in the encoded data stream. In other embodiments both output data of the time-domain encoder 220 and the frequency-domain encoder 230 may be included in the encoded data stream. The transition indicator may be indicating whether a data segment is rather associated or correlated with a speech signal or with a music signal. In embodiments the frequency-domain encoder 230 may be used for more music-like data segments and the time-domain encoder 220 may be used for more speech-like data segments. In embodiments parallel encoding may be utilized, e.g. for a speech-like audio signal having background music.

In the embodiment depicted in FIG. 2c, multiple possibilities are conceivable for the controller 250 to control the multiple components within the apparatus 200. The different possibilities are indicated by dotted lines in FIG. 2c. For example, the controller 250 could be coupled to the time-domain encoder 220 and the frequency-domain encoder 230 in order to choose which encoder should produce an encoded output based on the transition indication. In another embodiment the controller 250 may control a switch at the outputs of the time-domain encoder 220 and the frequency-domain encoder 230.

In such an embodiment both the time-domain encoder 220 and the frequency-domain encoder 230 may encode all data segments and the controller 250 may be adapted for choosing via said switch which is coupled to the outputs of the encoders, which encoded data segment should be included in the encoded data stream, based on coding efficiency, respectively the transition indication. In other embodiments the controller 250 can be adapted for controlling the segment processor 210 for providing the data segments either to the time-domain encoder 220 or the frequency-domain encoder 230. The controller 250 may also control the segment processor 210 in order to set overlapping regions for a data segment. In other embodiments the controller 250 may be adapted for controlling a switch between the segment processor 210 and the time-domain encoder 220, respectively the frequency-domain encoder 230. The controller 250 could then influence the switch so to direct data segments to either one of the encoders, respectively to both. The controller 250 can be further adapted to set the windowing functions for the frequency-domain encoder 230 along with the overlapping regions and coding strategies.

Moreover, in embodiments the frequency-domain encoder 230 can be adapted for applying weights of window functions according to AAC specifications. The frequency-domain encoder 230 can be adapted for converting a windowed data segment to the frequency domain to obtain a frequency-domain data segment. Moreover, the frequency domain encoder 230 can be adapted for quantizing the frequency-domain data segments and, furthermore, the frequency-domain encoder 230 may be adapted for evaluating the frequency-domain data segments according to a perceptual model.

The frequency-domain encoder 230 can be adapted for utilizing a cosine modulated filterbank, an extended lapped transform, a low-delay filterbank or a polyphase filterbank to obtain the frequency-domain data segments.

The frequency-domain encoder 230 may be adapted for utilizing an MDCT to obtain the frequency data segments. The time-domain encoder 220 can be adapted for using a prediction model for encoding the data segments.

In embodiments where an MDCT in the frequency-domain encoder 230 operates in a so-called long block mode, i.e. the regular mode of operation that is used for coding non-transient input signals, compare AAC-specifications, the overhead introduced by the switching process may be high. This can be true for the cases where only one frame, i.e. a length/framing rate of N samples, should be coded using the time-domain encoder 220 instead of the frequency-domain encoder 230.

Figure 3A:
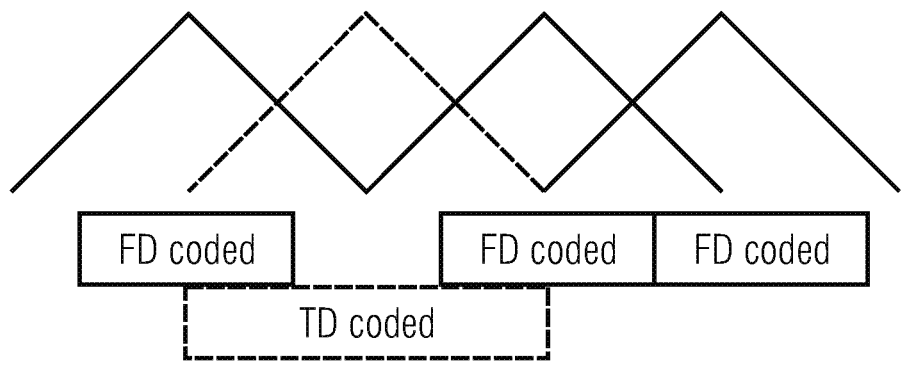
FIG. 3a illustrates overlapping regions when switching between frequency-domain and time-domain coding for the duration of one window.

Then all the input values for the MDCT may have to be encoded with the time-domain encoder 220, i.e. 2N samples are available at the output of the time-domain decoder 110. Thus, an overhead of N additional samples could be introduced. FIGS. 3a to 3d illustrate some conceivable overlapping regions of segments, respectively applicable windowing functions. 2N samples may have to be coded with the time-domain encoder 220 in order to replace one block of frequency-domain encoded data. FIG. 3a illustrates an example, where frequency-domain encoded data blocks use a solid line, and time-domain encoded data uses a dotted line. Underneath the windowing functions data segments are depicted which can be encoded in the frequency domain (solid boxes) or in the time domain (dotted boxes). This representation will be referred to in FIGS. 3b to 3d as well.

FIG. 3a illustrates the case where data is encoded in the frequency domain, interrupted by one data segment which is encoded in the time domain, and the data segment after it is encoded in the frequency domain again. In order to provide the time-domain data which is useful to cancel the time-domain aliasing evoked by the frequency-domain encoder 230, when switching from the frequency domain to the time domain, half of a segment size of overlapping may be used, the same holds from switching back from the time domain to the frequency domain. Assuming that the time-domain encoded data segment in FIG. 3a has a size of 2N, then at its start and at the end it overlaps with the frequency-domain encoded data by N/2 samples.

Figure 3B:
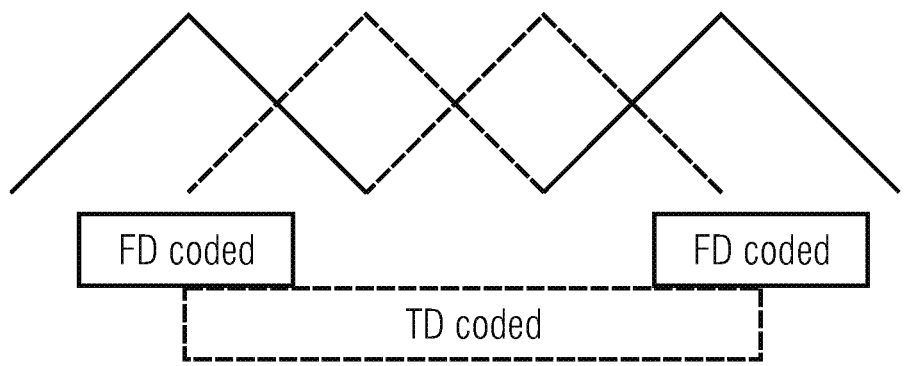
FIG. 3b illustrates the overlapping regions when switching between frequency-domain coding and time-domain coding for a duration of two windows.

In case more than one subsequent frames can be encoded using the time-domain encoder 220, the overhead for the time-domain encoded section stays at N samples. As it is illustrated in FIG. 3b where two consecutive frames are encoded in the time domain and the overlapping regions at the beginning and the end of the time-domain encoded sections have the same overlap as it was explained with respect to FIG. 3a. FIG. 3b shows the overlap structure in case of two frames encoded with time-domain encoder 220. 3N samples have to be coded with the time-domain encoder 220 in this case.

Figure 3C:
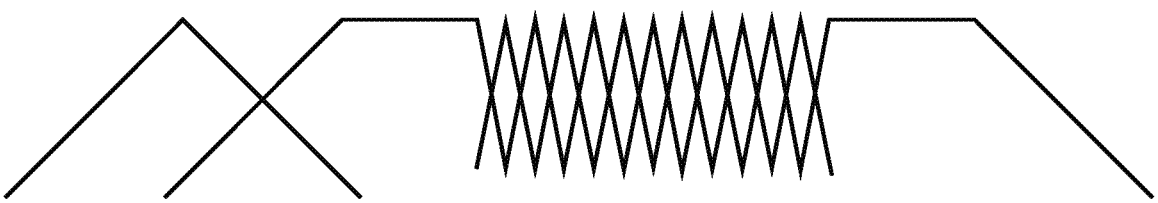
FIG. 3c illustrates multiple windows with different overlapping regions.

This overhead can be reduced in embodiments by utilizing window switching, for example, according to the structure which is used in AAC. FIG. 3c illustrates a typical sequence of Long, Start, 8Short and Stop windows, as they are used in AAC. From FIG. 3c it can be seen that the window sizes, the data segment sizes and, consequently, the size of the overlapping regions change with the different windows. The sequence depicted in FIG. 3c is an example for the sequence mentioned above.

Figure 3D:
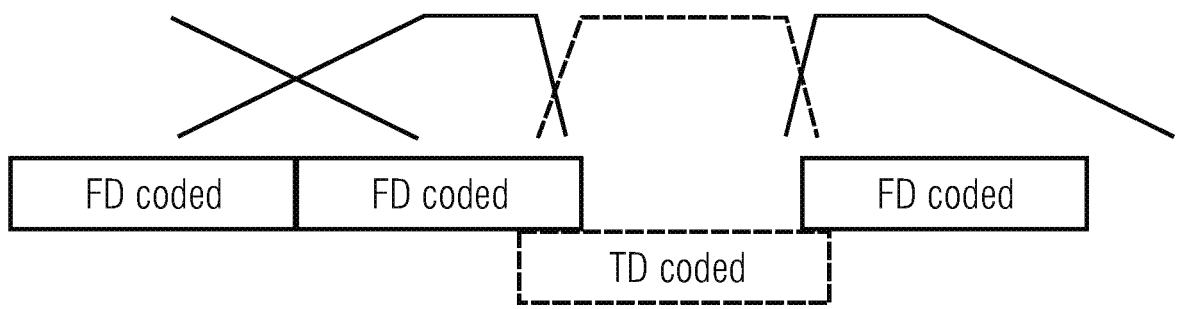
FIG. 3d illustrates the utilization of windows with different overlapping regions in an embodiment.
Figure 4:
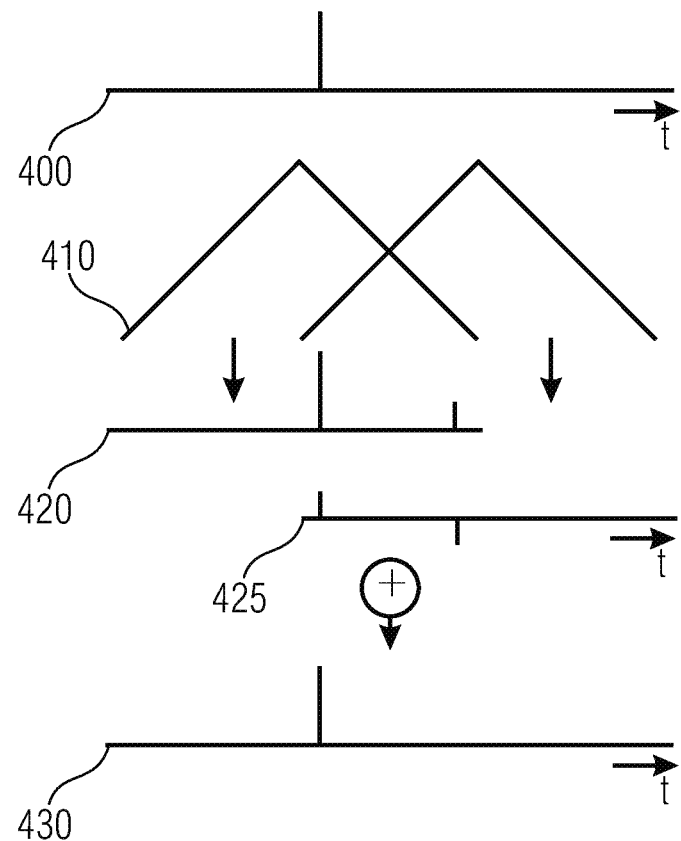
FIG. 4 illustrates time-domain aliasing cancellation when using MDCT.

Embodiments should not be limited to windows of the size of AAC windows, however, embodiments take advantage of windows with different overlapping regions and also of windows of different durations. In embodiments transitions to and from short windows may utilize a reduced overlap as, for example, disclosed in Bernd Edler, "Codierung von Audiosignalen mit überlappender Transformation and adaptiven Fensterfunktionen", Frequenz, Vol. 43, No. 9, p. 252-256, September 1989 and Generic Coding of Moving Pictures and Associated Audio: Advanced Audio Coding, International Standard 13818-7, ISO/IEC JTC1/SC29/WG11 Moving Pictures Expert Group, 1997 may be used in embodiments to reduce the overhead for the transitions to and from the time-domain encoded regions, as it is illustrated in FIG. 3d. FIG. 3d illustrates four data segments, of which the first two and the last one are encoded in the frequency domain and the third one is encoded in the time domain. When switching from the frequency domain to the time domain different windows with the reduced overlapping size are used, therewith reducing the overhead.

In embodiments the transition may be based on Start and Stop windows identical to the ones used in AAC. The corresponding windows for the transitions to and from the time-domain encoded regions are windows with only small regions of overlap. As a consequence, the overhead, i.e. the number of additional values to be transmitted due to the switching process decreases substantially. Generally, the overhead may be $N_{ovl}/2$ for each transition with the window overlap of $N_{ovl}$ samples. Thus, a transition with the regular fully-overlapped window like an AAC with $N_{ovl}=1024$ incurs an overhead of 1024/2=512 samples for the left, i.e. the fade-in window, and 1024/2=512 samples for the right, i.e. the fade-out window, transition resulting in a total overhead of 1024 (=N) samples. Choosing a reduced overlap window like the AAC Short block windows with $N_{ovl}=128$ only results in an overall overhead of 128 samples.

Embodiments may utilize a filterbank in the frequency-domain encoder 230 as, for example, the widely used MDCT filterbank, however, other embodiments may also be used with frequency-domain codecs based on other cosine-modulated filterbanks. This may comprise the derivates of the MDCT, such as extended lapped transforms or low-delay filterbanks as well as polyphase filterbanks, such as, for example, the one used in MPEG-1-Layer-1/2/3 audio codecs. In embodiments efficient implementation of a forward/back-filterbank operation may take into account a specific type of window and folding/unfolding used in the filterbank. For every type of modulated filterbank the analysis stage may be implemented efficiently by a preprocessing step and a block transform, i.e. DCT-like or DFT, for the modulation. In embodiments the corresponding synthesis stage can be implemented using the corresponding inverse transform and a post processing step. Embodiments may only use the pre- and post processing steps for the time-domain encoded signal portions.

Embodiments of the present invention provide the advantage that a better code efficiency can be achieved, since switching between a time-domain encoder 220 and the frequency-domain encoder 230 can be done introducing very low overhead. In signal sections of subsequent time-domain encoding only, overlap may be omitted completely in embodiments. Embodiments of the apparatus 100 enable the according decoding of the encoded data stream.

Embodiments therewith provide the advantage that a lower coding rate can be achieved for the same quality of, for example, an audio signal, respectively a higher quality can be achieved with the same coding rate, as the respective encoders can be adapted to the transience in the audio signal.

Depending on certain implementation requirements of the inventive methods, the inventive methods can be implemented in hardware or in software. The implementation can be performed using a digital storage medium, in particular a disc, DVD or CD having electronically stored control signals stored thereon, which corporate with the programmable computer system such that the inventive methods are performed. Generally, the present invention is, therefore, a computer program product having a program code stored on a machine-readable carrier, the program code being operative for performing the inventive methods when the computer program product runs on a computer. In other words, the inventive methods are, therefore, a computer program having a program code for performing at least one of the inventive methods when the computer program runs on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus for decoding data segments representing a time-domain data stream, a data segment encoded in a time domain, a data segment encoded in a frequency domain having successive blocks of data representing successive and overlapping blocks of time-domain data samples, the apparatus comprising:
   a time-domain decoder for decoding the data segment encoded in the time domain;

a processor for processing the data segment encoded in the frequency domain and output data of the time-domain decoder to obtain overlapping time-domain data blocks; and an overlap/add-combiner for combining the overlapping time-domain data blocks to obtain decoded data segments of a time-domain data stream.

2. The apparatus of claim 1, wherein the processor comprises a frequency-domain decoder for decoding the data segment encoded in the frequency domain to obtain one or more frequency-domain data segments.

3. The apparatus of claim 2, wherein the processor comprises a time-domain to frequency-domain converter for converting the output data of the time-domain decoder to obtain converted frequency-domain data segments.

4. The apparatus of claim 1, wherein the processor comprises a calculator for calculating the overlapping time-domain data blocks based on the output data of the time-domain decoder.

5. The apparatus of claim 4, wherein the calculator is adapted for reproducing an overlapping property of a frequency-domain to time-domain converter based on the output data of the time-domain decoder.

6. The apparatus of claim 5, wherein the calculator is adapted for reproducing a time-domain aliasing characteristic of the frequency-domain to time-domain converter based on the output data of the time-domain decoder.

7. The apparatus of claim 4, wherein the calculator is adapted for segmenting the output data of the time-domain decoder in calculator segments comprising 2N sequential samples, applying weights to the 2N sequential samples according to an analysis window function, subtracting a first set of N/2 samples in reversed order from a second set of N/2 samples, adding a fourth set of N/2 samples in reversed order to a third set of N/2 samples, inverting the second and third sets of N/2 samples, replacing the first set of N/2 samples with a time-reversed and inverted version of the second set of N/2 samples, replacing the fourth set of N/2 samples with a time-reversed version of the third set of N/2 samples, and applying weights to the 2N sequential samples according to a synthesis windowing function.

8. The apparatus of claim 4, wherein the calculator is adapted for applying weights to 2N samples according to an analysis windowing function being adapted to a size of an overlapping region of consecutive overlapping time-domain data blocks and wherein the calculator is adapted for applying weights to the 2N samples according to a synthesis windowing function being adapted to the size of the overlapping region.

9. The apparatus of claim 1, wherein the processor comprises a calculator, and wherein the calculator comprises a time-domain aliasing stage for time-aliasing the output data of the time-domain decoder to obtain the overlapping time-domain data blocks.

10. The apparatus of claim 1, wherein a size of an overlapping region of two consecutive time-domain data blocks which are encoded in the frequency domain is larger than a size of an overlapping region of two consecutive time-domain data blocks of which one being encoded in the frequency domain and one being encoded in the time domain.

11. Method for decoding data segments representing a time-domain data stream, a data segment encoded in the time domain, a data segment encoded in the frequency domain having successive blocks of data representing successive and overlapping blocks of time-domain data samples, comprising the steps of:

decoding the data segment encoded in the time domain to obtain time-domain output data;

processing the data segment encoded in the frequency domain and the time-domain output data to obtain overlapping time-domain data blocks; and combining the overlapping time-domain data blocks to obtain decoded data segments of a time-domain data stream.

12. A non-transitory computer readable medium having code stored thereon, the code when executed by a processor, causing the processor to implement a method of claim 11.

* * * * *

UNITED STATES PATENT AND TRADEMARK OFFICE
CERTIFICATE OF CORRECTION

PATENT NO. : 10,714,110 B2
APPLICATION NO. : 15/595170
DATED : July 14, 2020
INVENTOR(S) : Ralf Geiger et al.

It is certified that error appears in the above-identified patent and that said Letters Patent is hereby corrected as shown below:

On the Title Page

Item (54) and in the Specification, Column 1, Lines 1-3:
Please change "DECODING DATA SEGMENTS REPRESENTING A TIME-DOMAIN DATA STREAM"

To read:
--ENCODER, DECODER AND METHODS FOR ENCODING AND DECODING DATA SEGMENTS REPRESENTING A TIME-DOMAIN DATA STREAM--.

Signed and Sealed this
Eighteenth Day of August, 2020

Andrei Iancu
*Director of the United States Patent and Trademark Office*